FREQUENCY TRANSLATION AND COMPRESSION SYSTEM

Filed June 1, 1959

INVENTOR.
LAURIN G. FISCHER
BY Charles Baraff
AGENT

United States Patent Office 3,130,367

Patented Apr. 21, 1964

3,130,367
FREQUENCY TRANSLATION AND COMPRESSION SYSTEM

Laurin G. Fischer, Glen Rock, N.J., assignor to International Telephone and Telegraph Corporation, Nutley, N.J., a corporation of Maryland Filed June 1, 1959, Ser. No. 817,421
4 Claims. (Cl. 325—308)

Figures 1, 2:
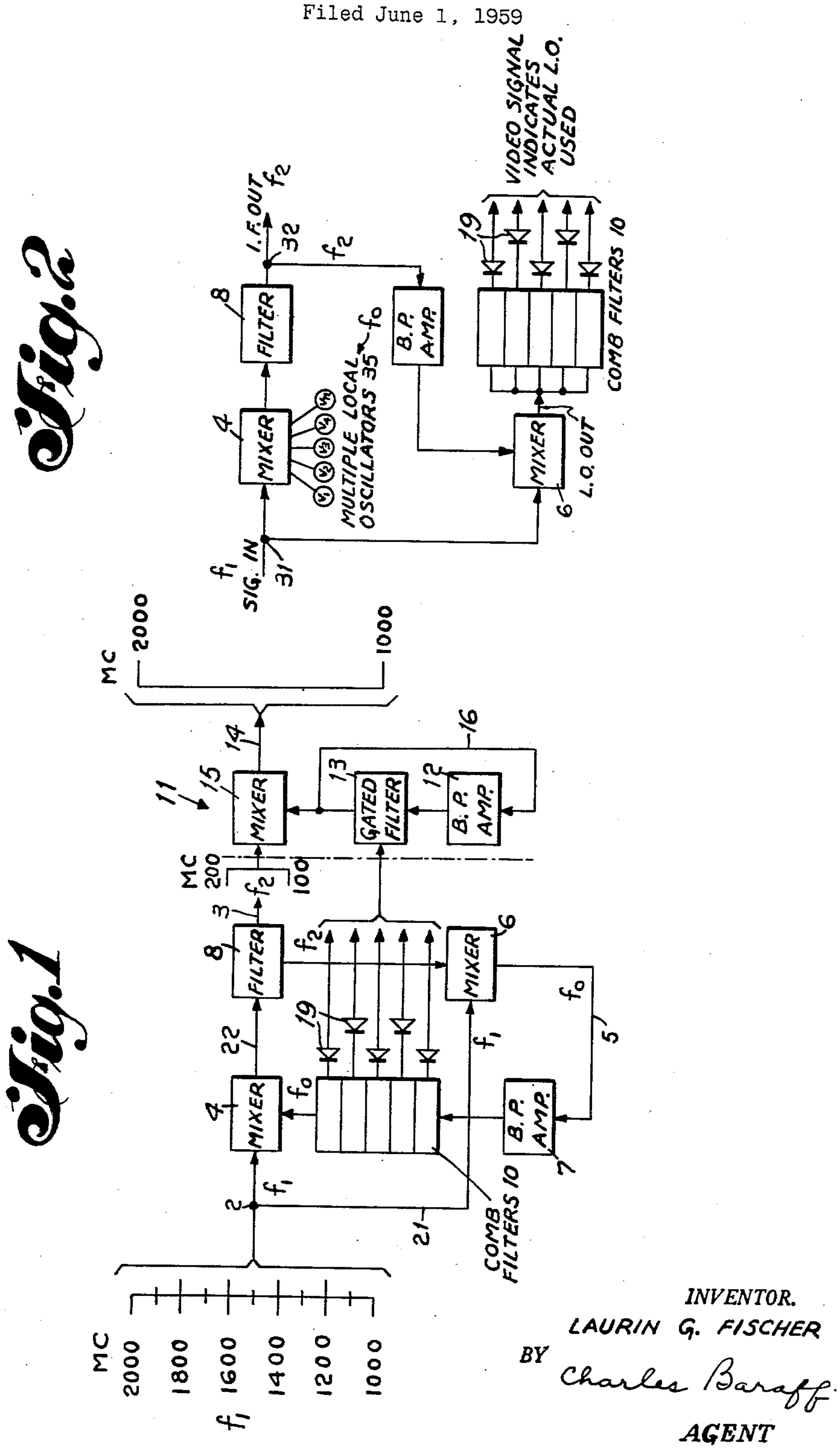

This invention relates to the translation of signal frequencies from one range to another in the frequency spectrum, and more particularly, from the microwave to the VHF band of radio frequencies.

The translation of signal frequencies from one part of frequencies to a narrower band in the frequency spec- circuits which combine a locally generated oscillation with the input signals in order to derive frequencies shifted in the frequency spectrum is well known. Such systems usually necessitate separate sources of local oscillations for providing a beating frequency for the mixer. The local oscillators may involve complicated circuits including frequency multipliers, frequency stabilizers and the like. There has been a long-felt need for simpler expedients for providing local oscillations, and frequently there is a distinct need for generating the local oscillations only when input signals are present.

Often it is desirable to shift and translate a broad band of frqeuencies to a narrower band in the frequency spectrum. Where multiple local sources of oscillation are provided for this purpose, it has frequency been a problem to determine which of the local oscillators was active in the frequency shifting operation.

On the other hand, circumstances arise where it is desirable to dispense with separate local oscillators altogether, and in such instances, it becomes necessary to generate the local oscillations by other expedients.

Accordingly, an object of the invention is to shift a sequence of input signals from one frequency range to another frequency range by means of local oscillations initiated and regenerated only when the input signals are present, and concomitantly the local oscillations will be absent when no input signal exists.

A further object of the invention is to shift signals from one part of the spectrum to another without using local oscillators, but by regenerating frequencies derived from the signals by mixers.

A feature of the invention is a frequency shifting circuit with two mixers in parallel, whose inputs are a multiplicity of time-sequential signals in a band of frequencies, and wherein the second mixer provides in its output a regenerated local oscillation for beating with the original signals. Consequently, the local oscillation frequency is initiated only when an input to the first mixer is present.

Further features of the invention, where multiple local oscillators are utilized in the mixing of the sequential signals, are two parallel mixer circuits and a comb filter for eliminating any ambiguity in the identification of the shifted, sequential signals by segregating and identifying which one of the local oscillators was active at the time the signal was received and mixed.

The above-mentioned and other features and objects of this invention will become more apparent by reference to the following description taken in conjunction with the accompanying drawings, in which:

FIG. 1 is a schematic of a mixer circuit for frequency translation and compression in accordance with the invention; and FIG. 2 is a modification of the mixer circuit of FIG. 1.

Referring to FIG. 1, a series of sequential signals $f_1$ which are located in a higher frequency range, for example, 1000 to 2000 megacycles, are applied at input terminal 2 to a mixer circuit 4 so that output signals in a lower range of the frequency spectrum, for example, 100 to 200 megacycles, are derived at output terminal 3. In a first mixer 4 located in path 22, the input signals $f_1$ combine with a beating frequency $f_0$, representing a local oscillation produced only by regeneration when a signal is present. The beating frequency $f_0$ is derived from a second mixer circuit 6 by combining the original signals $f_1$ in path 21 with $f_2$, the lower sideband derived from the first mixer 4. The resultant output from mixer 6 is designated the local oscillation frequency $f_0=f_1-f_2$ i.e. the difference between the signal frequencies in the high range and the shifted frequencies in the lower range. The local oscillations $f_0$ are amplified in bandpass amplifier 7 and applied to the mixer 4. A filter 8 separates the lower sideband frequency $f_2$ in the output of the first mixer 4. In a like manner, the system can be set up to employ the upper sideband.

In the absence of input signals $f_1$, it should be apparent that no local oscillations $f_0$ will be available in the feedback loop 5 of bandpass amplifier 7. Only when input signals are present at terminal 2 will the local oscillations $f_0$ be initiated from the presence of random noise, as is well known, and regenerated in bandpass amplifier 7 for application to the first mixer 4 as a heterodyning frequency. The first mixer 4 effectively combines the input signals $f_1$ with the locally generated oscillations $f_0$ to provide the lower sideband frequencies in a lower frequency band, resulting from the filtering by sideband filter 8. The lower range of frequencies will, for example, be located in a band of 100–200 megacycles width as a result of the frequency shift, which represents a frequency compression of the original signal band.

The range of the sideband filter 8 is narrow so that it will only pass signals in the 100–200 megacycle band and reject all other frequencies derived from mixer 4 when the local-oscillator frequency applied to mixer 4 is not the desired local-oscillation frequency. The net result is a frequency compression of the original frequency band.

The feedback loop 5 contains a bandpass amplifier 7 for amplifying the local oscillations $f_0$ derived from the mixer 6 before injection into the first mixer 4.

In a typical application of the frequency-shifting mixer circuit 4, the input signals $f_1$ were pulses picked up in the microwave frequency range, and the output signals were derived pulses shifted into a lower frequency band, such as the VHF band. It should be noted that the process of deriving the local oscillations from the second mixer 6 gives $f_0=f_1-f_2$, while the combination of frequencies in the first mixer 4 provides $f_2=f_1-f_0$.

The local oscillations $f_0$ were amplified in a traveling-wave-tube amplifier 7, and the code pulses were segregated and detected in a set of comb filters 10 whereby pulse spikes in the video range were derived for control purposes described below. It is important that the frequency spacing between peak responses of the comb filter 10 be equal to or greater than the output bandwidth of sideband filter 8.

In the absence of input signals $f_1$, no local-oscillation voltages $f_0$ were derived from mixer 6. As soon as input signals appeared at terminal 2, the local oscillations were initiated in mixer 6 and regenerated in the feedback loop 5 through bandpass amplifier 7. The code pulses in the video range were derived directly through detectors 19 connected to the comb filter 10, and may be recorded directly or utilized as gating control pulses. The local oscillations, also passing through comb filter 10, are then injected into mixer 4.

In the compressed frequency range, the signals may undergo various operations, such as amplification at I.F. as in radio relay work or delay as by ultra-sonic delay lines, as is well known.

To obtain the original range of frequencies again, the VHF signals of lower frequency range are shifted by a second frequency-shifting circuit 11, shown in FIG. 1, which consists of a mixer 15 to which are applied the frequencies $f_2$ of the lower range. The mixer 15 combines these frequencies $f_2$ with oscillations locally regenerated in a feedback loop 16 containing the bandpass amplifier 12 and a gated filter 13. In the local feedback loop 16, the beating oscillations $f_0$ are regenerated in bandpass amplifier 12 for application to the mixer 15, whereby the combined frequencies $(f_2+f_0)$ appearing in the output of the mixer 15 represent the original high frequency range $f_1$.

An identical comb filter 13 gated by the code pulses in a well known manner will permit the original pulses to reappear at output terminal 14 in the original frequency range, for example, 1000 to 2000 megacycles as indicated in FIG. 1.

FIG. 2 shows a modified frequency-translation system, characterized by multiple local oscillators injecting their respective frequencies $\nu_1 \ldots \nu_n$ into the frequency-shifting mixer in lieu of the locally regenerated oscillations described in FIG. 1.

The main object of this embodiment is to avoid ambiguity in identification of shifted signals. Therefore, it is important here to be able to determine and identify which particular local oscillator was active in a frequency-shift operation.

Referring to FIG. 2, the frequency translation and compression system extending from the input terminal 31 to the output 32 is similar to that disclosed in FIG. 1 and includes a first mixer 4, sideband filter 8, a second mixer 6, comb filter 10 and bandpass amplifier 7. However, instead of regenerating local oscillations as in FIG. 1, a plurality of separate local oscillators 35 are provided for injecting discrete frequencies in a range comprising for example, 1000–2000-megacycles into the mixer 4. In this range, there will be a 200-megacycle base-frequency oscillator and the 5th to 10th harmonics thereof, as the local oscillators.

The input signal, as heretofore, comprises a sequential series of pulse signals, corresponding to a variety of received radar pulses or the like, picked up at discrete times by a receiving antenna.

In order to avoid the ambiguity in identification of shifted signals, the output of sideband filter 8 is amplified by broadband amplifier 7, and mixed with the input signals $S_{in}$ in the second mixer 6 to derive the local oscillation frequencies $\nu_1 \ldots \nu_n$, which are segregated by comb filter 10 and detected by diodes 19.

In this manner, a particular one of the local oscillators 35, which becomes active at the receipt of a radar pulse, will be identified in the output of detector diodes 19.

It should be apparent to those skilled in the art that in lieu of multiple local oscillators as in FIG. 2, a single base band oscillator with multipliers or harmonic producers may be used to provide the injected local oscillation frequencies.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency-translation system, for translating signals between different frequency bands, comprising a source of sequential multi-frequency input signals, and circuit means for producing local oscillations of multiple discrete frequencies in response to said input signals, said circuit means including first and second frequency mixers, each having at least two input terminals and at least one output terminal, a first input terminal of each of said frequency mixers being coupled to said source of sequential multi-frequency input signals, an output terminal of said first one of said frequency mixers being coupled through first filter means to a second input terminal of said second one of said frequency mixers, an output terminal of said second one of said frequency mixers being coupled through amplifier and comb-filter means to a second input terminal of said first one of said frequency mixers, said first filter means having non-uniform frequency-transmission properties for limiting the signal output of said first filter means to frequencies on only one side of said multiple discrete frequencies of said local oscillations, and said first filter means having an output terminal for the delivery of said limited signal output.

2. A frequency-translation system, for translating signals between different frequency bands, comprising a source of sequential multi-frequency input signals, and circuit means for producing local oscillations of multiple discrete frequencies in response to said input signals, said circuit means including first and second frequency mixers each having at least two input terminals and at least one output terminal, a first input terminal of each of said frequency mixers being coupled to said source of sequential multi-frequency input signals, an output terminal of said first one of said frequency mixers being coupled through first filter means to a second input terminal of said second one of said frequency mixers, an output terminal of said second one of said frequency mixers being coupled through amplifier and comb-filter means to a second input terminal of said first one of said frequency mixers, said first filter means having non-uniform frequency-transmission properties for limiting the signal output of said first filter means to frequencies on only one side of said multiple discrete frequencies of said local oscillations, said comb-filter means having respective output lines for local oscillations of said multiple discrete frequencies, and said first filter means having an output terminal for the delivery of said limited signal output.

3. A frequency-translation system, for translating signals between different frequency bands, comprising a source of sequential multi-frequency input signals, circuit means for producing local oscillations of multiple discrete frequencies and for mixing said input signals with selected ones of said local oscillations to derive frequency-translated signals, and means for re-translating said frequency-translated signals to the respective frequencies of said sequential multi-frequency input signals, said circuit means including first and second frequency mixers, each having at least two input terminals and at least one output terminal, a first input terminal of each of said frequency mixers being coupled to said source of sequential multi-frequency input signals, an output terminal of said first one of said frequency mixers being coupled through first filter means to a second input terminal of said second one of said frequency mixers, an output terminal of said second one of said frequency mixers being coupled through amplifier and comb-filter means to a second input terminal of said first one of said frequency mixers, said first filter means having non-uniform frequency-transmission properties for producing said frequency-translated signals by limiting the signal output of said first filter means to frequencies on only one side of said multiple discrete frequencies of said local oscillations, said comb-filter means having respective output lines for local oscillations of said multiple discrete frequencies, and said means for retranslating said frequency-translated signals including gated filter means, a third frequency mixer, and bandpass-amplifier means, said gated filter means being fed from the respective output lines of said comb-filter means and from said bandpass-amplifier means to produce filtered local oscillations, said filtered local oscillations being fed back to the input of said bandpass-amplifier means and also as a first input to said third frequency mixer, a second input of said third frequency mixer being coupled with the output of said first filter means to derive therefrom said frequency-translated signals, and said third frequency mixer operating upon said filtered local oscillations and upon said frequency-translated signals to give an output signal retranslated to the respective frequencies of said sequential multi-frequency input signals.

4. A frequency-translation system, for translating signals between different frequency bands, comprising a source of sequential multi-frequency input signals, means for producing local oscillations of multiple discrete frequencies, and circuit means for mixing said multi-frequency input signals with said local oscillations and for filtering the resultant wave to produce a frequency-limited signal output, said circuit means including first and second frequency mixers, each having at least two input terminals and at least one output terminal, a first input terminal of each of said frequency mixers being coupled to said source of sequential multi-frequency input signals, an output terminal of said first one of said frequency mixers being coupled through first filter means and amplifier means to a second input terminal of said second one of said frequency mixers, an output terminal of said second one of said frequency mixers being coupled through comb-filter means to respective output lines for local oscillations of said multiple discrete frequencies, said first filter means having non-uniform frequency-transmission properties for limiting the signal output of said first filter means to frequencies on only one side of said multiple discrete frequencies of said local oscillations, and said first filter means having an output terminal for the delivery of said frequency-limited signal output.

References Cited in the file of this patent

UNITED STATES PATENTS

| | | |
|---|---|---|
| 2,108,117 | Gardere et al. | Feb. 15, 1938 |
| 2,622,191 | Van Zelst et al. | Mar. 16, 1952 |
| 2,623,169 | Gardere | Dec. 23, 1952 |
| 2,773,179 | Makow | Dec. 4, 1956 |
| 2,841,704 | Sunstein et al. | July 1, 1958 |
| 2,952,808 | Hurvitz | Sept. 13, 1960 |
| 3,088,069 | Markey | May 30, 1963 |

FOREIGN PATENTS

| | | |
|---|---|---|
| 164,788 | Japan | 1944 |